(12) United States Patent
Bigolin

(10) Patent No.: US 12,258,094 B2
(45) Date of Patent: Mar. 25, 2025

(54) COVERING TAPE FOR BICYCLE HANDLEBARS AND THE MANUFACTURING METHOD THEREOF

(71) Applicant: SELLE ITALIA S.R.L., Treviso (IT)

(72) Inventor: Giuseppe Bigolin, Treviso (IT)

(73) Assignee: SELLE ITALIA S.R.L., Treviso (IT)

( * ) Notice: Subject to any disclaimer, the term of this patent is extended or adjusted under 35 U.S.C. 154(b) by 50 days.

(21) Appl. No.: 18/127,883

(22) Filed: Mar. 29, 2023

(65) Prior Publication Data

US 2023/0312047 A1 Oct. 5, 2023

(30) Foreign Application Priority Data

Mar. 29, 2022 (IT) .......................... 102022000006140

(51) Int. Cl.
*B62K 21/26* (2006.01)
(52) U.S. Cl.
CPC ................................... *B62K 21/26* (2013.01)
(58) Field of Classification Search
None
See application file for complete search history.

(56) References Cited

U.S. PATENT DOCUMENTS

| 2003/0139223 A1* | 7/2003 | Ulrich ................... A63B 60/00 473/301 |
| 2008/0034915 A1 | 2/2008 | Bigolin |
| 2008/0040890 A1 | 2/2008 | Chang |

FOREIGN PATENT DOCUMENTS

| CA | 3015299 A1 | 2/2019 |
| CN | 205396395 U | 7/2016 |
| DE | 20 2019 103545 U1 | 11/2019 |
| EP | 2281453 B1 | 8/2015 |
| TW | M522176 U | 5/2016 |

OTHER PUBLICATIONS

European Search Report received for EP Application No. 23163637.4 on Jul. 19, 2023, 7 pgs.
Italian Search Report received for Italian Application No. 10 2022 000006140 on Nov. 24, 2022, 13 pgs.

* cited by examiner

*Primary Examiner* — Vicky A Johnson
(74) *Attorney, Agent, or Firm* — Merchant & Gould P.C.

(57) ABSTRACT

A covering tape for bicycle handlebars includes an elongated foldable body extending along a main longitudinal direction (X-X) between opposite axial ends. At one of the axial ends, the body is mechanically integral with a cylindrical closing cap of a hollow end of the bicycle handlebars.

20 Claims, 6 Drawing Sheets

COVERING TAPE FOR BICYCLE HANDLEBARS AND THE MANUFACTURING METHOD THEREOF

CROSS-REFERENCE TO RELATED APPLICATION

This U.S. patent application claims the benefit of Italian Application No. 10 2022 000006140 filed with the Italian Patent Office on Mar. 29, 2022, the entire contents of which is incorporated herein by reference.

FIELD OF APPLICATION

The present invention relates to a covering tape for bicycle handlebars, such as for racing bikes, and the manufacturing method thereof.

PRIOR ART

In the bicycle industry, particularly with regard to bicycles with curved handlebars, such as in the case of racing bikes or "gravel" bikes, handlebars are known to be covered with a tape. This covering concerns in particular each of the curved portions that are gripped by the user. In fact, one of the main purposes of the tape is to increase the grip of the handlebars, which are made of smooth tubes which have a circular cross-section and are made of metal or carbon fiber.

The tape is thus wound by the user in a spiral pattern, starting from the free or cantilevered end of each curved portion of the handlebars to a centerline portion where the stem of the handlebars is positioned.

The two free ends of the tape, i.e., the outer end, on the outer side of the handlebar, and the inner end, on the side of the stem, must be firmly fixed to prevent the tape from loosening and coming undone with use.

For this purpose, the inner end is known to be fixed with adhesive tape, typically insulating tape, while the outer end is secured by clamping with a cap, made of plastics or rubber material, which is inserted to close the hole in the free end of the handlebars (which are comprised of a hollow tube).

Moreover, in order to improve the grip of the tape on the handlebar, the inner side of the tape, intended to come in contact with the handlebars, is known to be equipped with a layer of glue.

Furthermore, in order to improve the mechanical strength, and thus the durability of the tapes, which must withstand the action of repeated mechanical rubbing and twisting by the user's hands, as well as the action of atmospheric elements, said tapes are made of strong materials with non-negligible thicknesses.

Therefore, the known solutions involve making a tape equipped with an inner layer of glue, suitable for being clamped by a cap on an end hole of the handlebars. Such a tape is made of a durable and fairly thick material.

The known solutions are not without technical drawbacks.

In fact, clamping the outer end of the tape by the closing cap is difficult to accomplish; moreover, sometimes the cap, which is made of a soft material, may loosen the tension of said tape, which then tends to unwind.

Moreover, the inner layer of adhesive, which is necessary to ensure the tape stays tight for longer, often loses effectiveness over time. In addition, the layer of glue tends to soil the outer side surface of the handlebars and, if not properly removed, limits the adhesion of the next tape arranged to replace the previous worn-out one.

Furthermore, the tapes of the prior art offer little tactile comfort to the user.

DISCLOSURE OF THE INVENTION

There is therefore a need to resolve the drawbacks and limitations mentioned with reference to the prior art.

This need is satisfied by a covering tape for bicycle handlebars and a method for manufacturing a covering tape.

BRIEF DESCRIPTION OF THE FIGURES

Further features and advantages of this invention will become more apparent from the following detailed description of preferred, non-limiting embodiments thereof, wherein.

Figure 1:
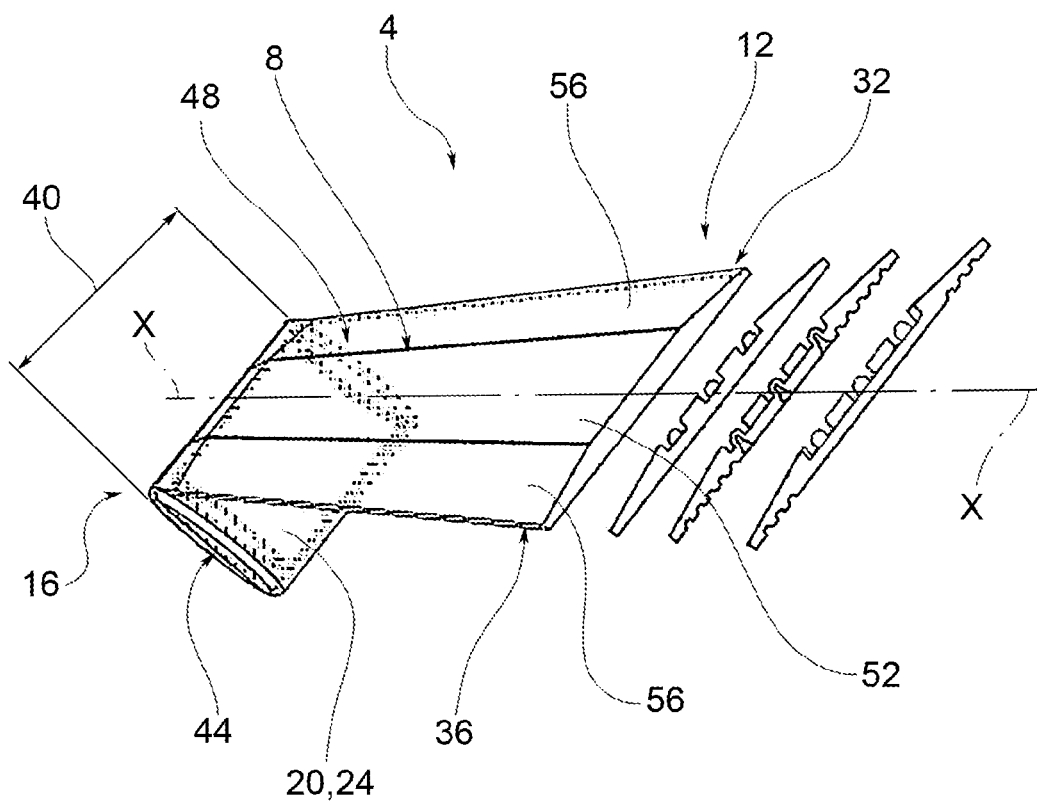
FIG. 1-3 are perspective views, from different angles, of a covering tape for bicycle handlebars in accordance with an embodiment of the present invention.
Figure 2:
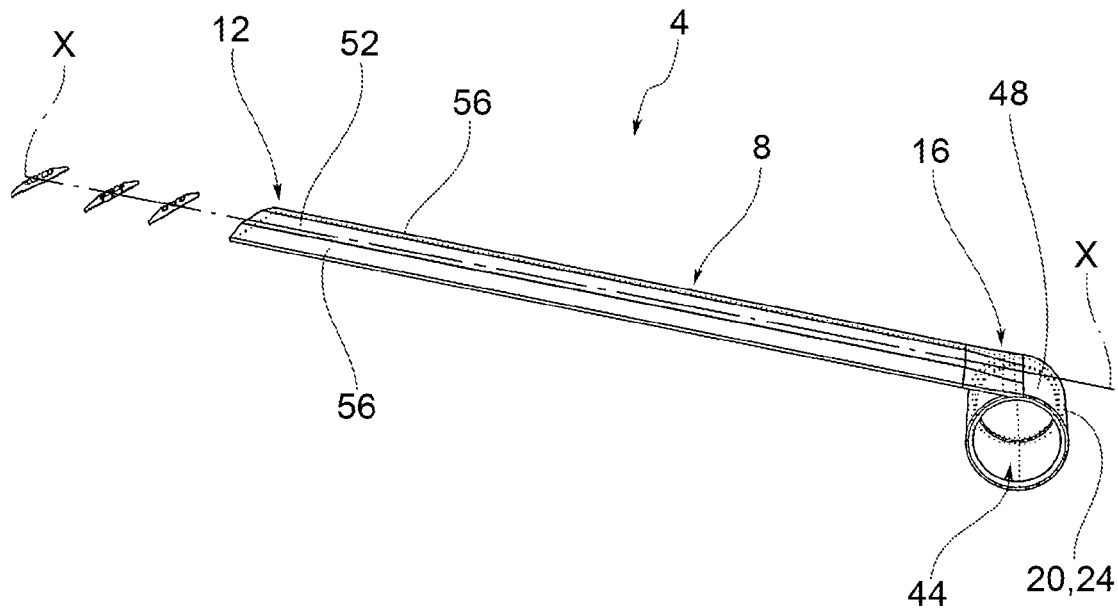
Figure 3:
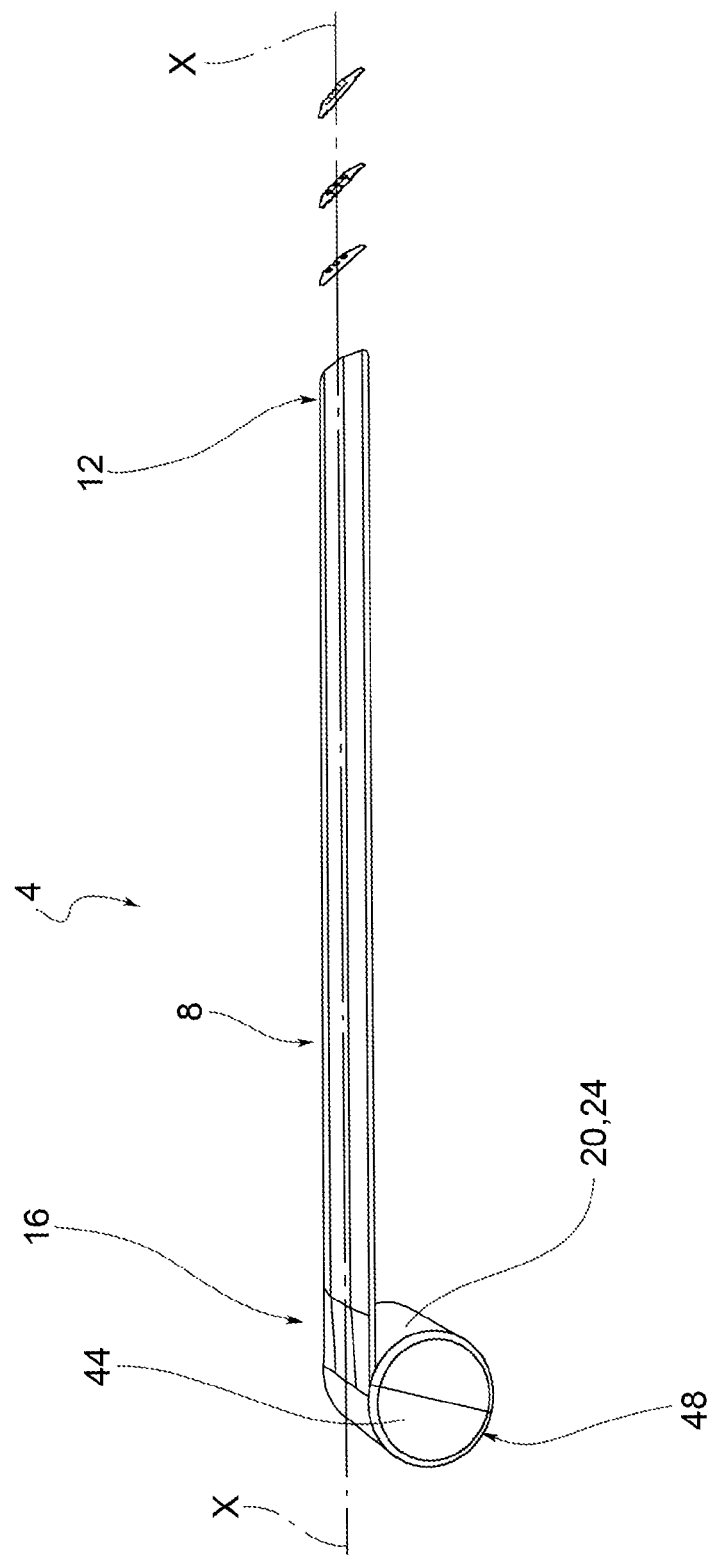

Elements or parts of elements common to the embodiments described hereinafter will be indicated with the same numerical references.

DETAILED DESCRIPTION OF THE INVENTION

With reference to the Figures, an overall view of a covering tape for bicycle handlebars 5 has been denoted globally with 4.

The covering tape 4 comprises an elongated foldable body 8, extending along a main longitudinal direction X-X between opposite axial ends 12,16.

According to a possible embodiment, the body 8 is symmetrical with respect to a centerline plane M-M parallel to said main longitudinal direction X-X.

At one of said axial ends 12,16, the body 8 is mechanically integral with a cylindrical closing cap 20 of a hollow end of said bicycle handlebars 5.

Preferably, the body 8, at one of said opposite axial ends 12,16, is fixed tangentially to an outer side wall 24 of said cylindrical closing cap 20.

According to a possible embodiment, the body 8 has a width 28, measured as the distance between opposite side edges 32,36 of the body 8 parallel to the main longitudinal direction X-X, equal to a height 40 of the cylindrical closing cap 20.

The body 8 is preferably aligned with the cylindrical closing cap 20, so that said side edges 32,36, which are parallel to each other, delimit a base 44 and a crown 48 of the cylindrical closing cap 20.

Preferably, the body 8 is made in one piece with said cylindrical closing cap 20.

For example, the body 8 is co-molded or co-extruded with said cylindrical closing cap 20.

According to a possible embodiment, the covering tape 4 is made by molding or extrusion of thermoplastic material, in particular a thermoplastic elastomer (TPE).

According to a possible embodiment, said thermoplastic material is a closed-cell thermoplastic material.

According to a possible embodiment, the tape 4 is made from thermoplastic material at least partially expanded by adding expanding additives. The expansion improves the user's sensation of grip and comfort. The use of a closed-cell expanding structure has the advantage of preventing water, dirt or moisture from entering into the body and on the handlebars 5, as well as preventing the dispersion of additives such as antibacterial additives.

In particular, according to a possible embodiment, the covering tape 4 is made from closed-cell thermoplastic material incorporating antibacterial additives.

According to a possible embodiment, the covering tape 4 is made of thermoplastic material that has a density between 0.3 and 0.90 g/cm3, preferably 0.50 g/cm3.

According to one embodiment, the material of the covering tape 4 has a hardness between 5 Shore A and 60 Shore A.

According to a possible embodiment, the covering tape 4 is bi-material with different hardnesses, wherein a center portion 52, straddling said centerline plane M-M of the covering tape 4, has a greater hardness, and side portions 56 between the center portion 52 and side edges 32,36 of the covering tape 4 have a lesser hardness.

According to a possible embodiment, the covering tape 4 is bi-material with different hardnesses, wherein an outer portion 60, opposite the associable handlebars 5, has a greater hardness, and an inner portion 64, intended to interface with the associable handlebars 5, has a lesser hardness.

The use of different materials serves to improve the grip comfort of the user, and to enhance the adhesion of the covering tape 4 on the handlebars 5 without the need to employ adhesives, as in the solutions of the prior art.

Figure 4:
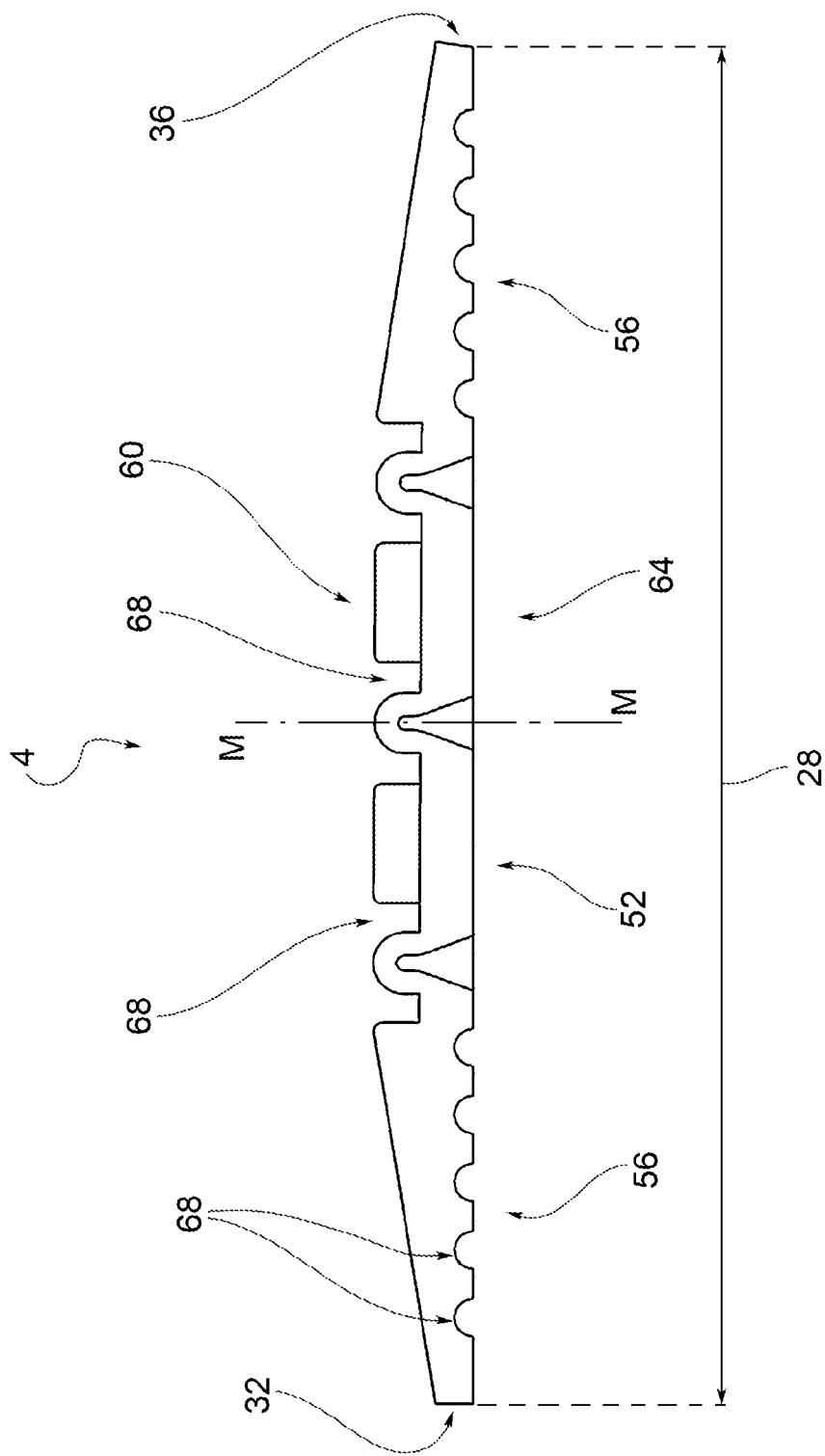
FIG. 4-6 depict, in cross-section, according to possible variant embodiments of the present invention, a covering tape for bicycle handlebars.
Figure 5:
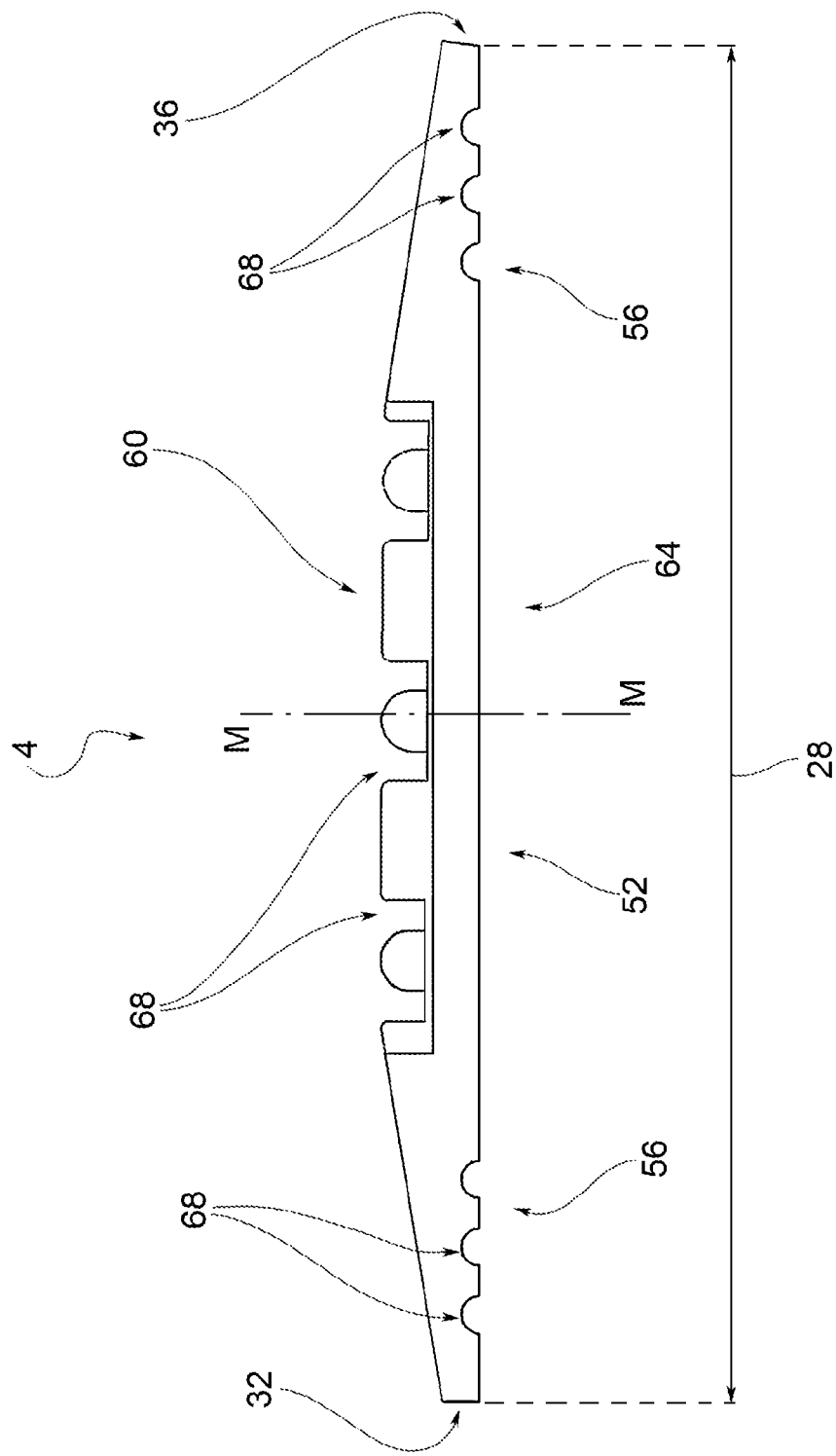
Figure 6:
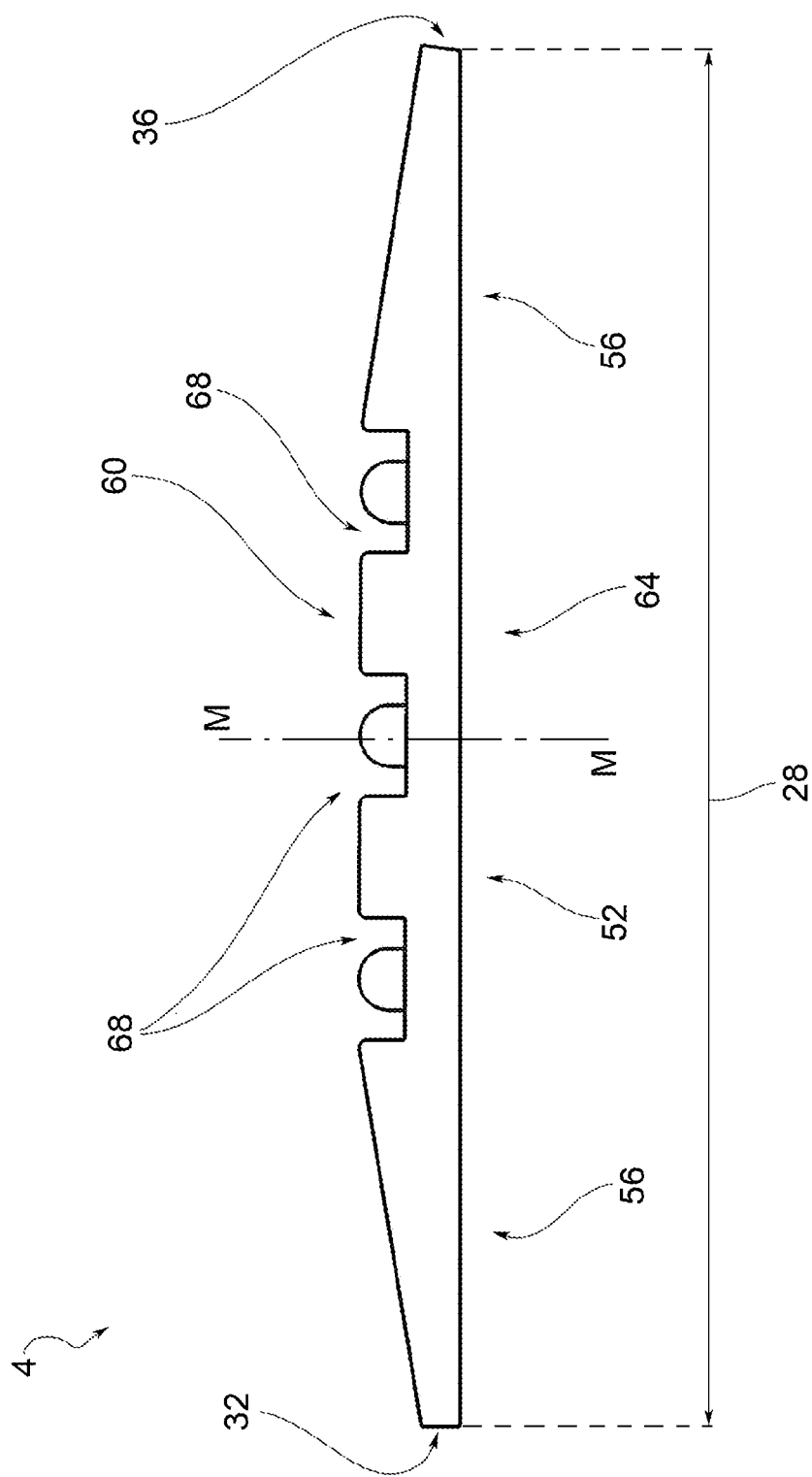

According to a possible embodiment, the body 8, with respect to a section plane perpendicular to the main longitudinal direction X-X (FIG. 4-6), has a symmetrical section with degrading thickness, moving from the centerline plane M-M toward the side edges 32,36 of the covering tape 4.

According to a possible embodiment, at an inner side intended to interface in contact with the handlebars 5, the body 8 comprises a plurality of grooves and/or lightenings (channels) 68.

Figure 7:
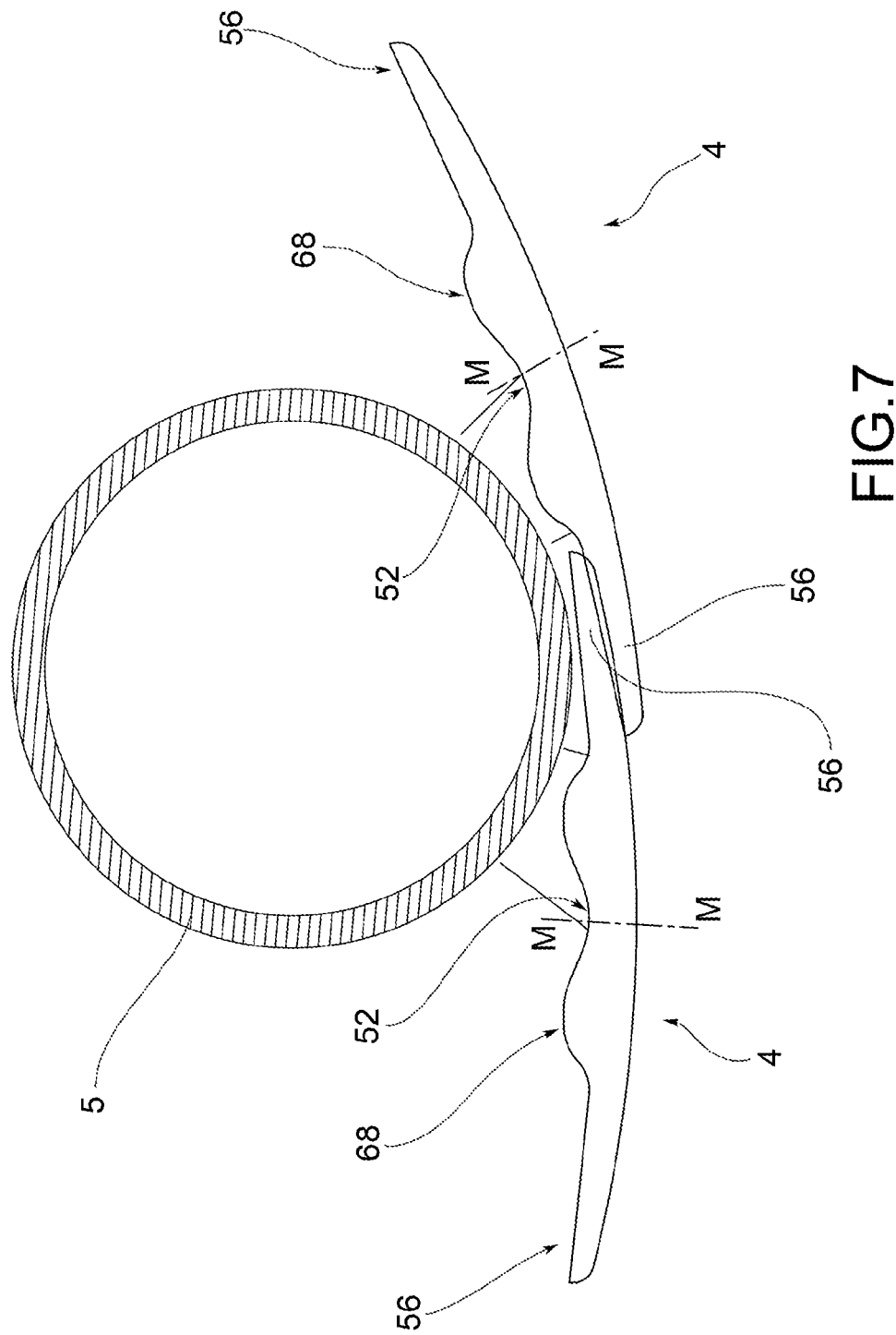
FIG. 7 is a cross-sectional view of bicycle handlebars with a covering tape, partially wrapped, according to a possible embodiment of the present invention.

In particular, according to a possible embodiment of the present invention (FIG. 7), the covering tape 4, at said inner side, comprises grooves and/or lightenings 68, located near the central portion 52 of the covering tape 4, straddling the centerline plane M-M, wherein said grooves or lightenings 68 have a wavy pattern, e.g., sinusoidal, located at said central portion 52, while the side portions 56 are tapered. In this way, following the winding of the covering tape 4 on the handlebars 5, the thinner side portions 56 advantageously overlap, avoiding the creation of areas of excessive thickness that would constitute uncomfortable portions for the user. In other words, the section described above entails non-negligible functional and aesthetic advantages. In fact, this section of winding tape 4 is very simple and functional because it allows for easier and more precise winding of the tape 4, creating a contact surface with the user's hand that is smoother and more even. In fact, the special shape of the section, during the overlapping of the spiral-wound tape on the handlebars 5, combined with the elasticity of the tape material, deforms in the overlapping areas, thus allowing optimal protection of the side edges 32,36 of the covering tape 4, which allows the hand to glide as much as possible on the tape/handlebar, without intercepting said side edges 32,36.

According to a possible embodiment, said grooves and/or lightenings 68 are located in side portions 56 close to the side edges 32,36 of the covering tape 4.

According to a possible embodiment, at an outer side intended to interface with the user's hands, the body 8 comprises a plurality of grooves and/or lightenings 68.

For example, said grooves and/or lightenings 68 are located near the central portion 52 of the covering tape 4, straddling the centerline plane M-M.

In general, said grooves and/or lightenings 68 serve to lighten the covering tape 4, and to improve the adaptability of the covering tape to the curvature of the handlebars 5 and to improve the gripping comfort for the user.

The method for manufacturing and assembling a tape according to the present invention will now be described.

In particular, the manufacturing method of a covering tape 4 for bicycle handlebars 5 comprising the steps of co-molding or co-extruding an elongated foldable body 8 extending along a main longitudinal direction X-X between opposite axial ends 12,16, and a cylindrical closing cap 20 of a hollow end of said bicycle handlebars 5.

In this way, following co-molding or co-extrusion, the cylindrical closing cap 20 is integral with one of said axial ends of the body 8.

As may be appreciated from that which has been described, the present invention overcomes the drawbacks of the prior art.

In particular, the present invention provides a tape that is easy to wrap/install due to the integration with the closing cap of the open end of the handlebar.

In fact, there is no need to worry about securing the tape by clamping it with the cap, as is done in the known solutions.

Moreover, there is no risk of losing the cap and loosening the outer end of the tape on the cap side, as is the case with solutions of the prior art.

In addition, due to the indications of the correct winding direction on the body of the tape, there is no risk of winding the tape in a direction that would promote loosening or unwinding of the tape with use. Specifically, it is sufficient for the tape on the right handlebar to be wrapped clockwise and the tape on the left handlebar to be wrapped counter-clockwise (the directions and sides are considered with respect to the user's position on the bike).

Advantageously, a tape may be manufactured of the same or even different material with respect to the cap to meet specific needs.

Moreover, the tape does not require any layer of glue on the inner side in contact with the handlebars, due to the fact that the material from which it is made has excellent adhesive properties. In this way there is no need to use harmful and even damaging adhesives since they tend, as seen, to soil the handlebars when the tape is removed.

Furthermore, the geometry of the section of the tape, fitted with appropriate grooves or outlets, together with the material from which it is made, makes for a tape that is both lightweight and comfortable to the touch for the user.

In addition, the tape may be made of closed-cell thermoplastic expanded material so as to prevent the penetration of water, dirt, or moisture that could accelerate the deterioration of the tape. Moreover, it is possible to incorporate antibacterial additives within the matrix of the tape.

There are also advantages in terms of ecology; in fact, the tape obtained from thermoplastic materials (e.g., from expanded TPE) or recycled thermoplastic materials may be obtained through an environmentally friendly manufacturing process, with zero km production, without the use of additional polluting components such as adhesives.

In addition, from a technical point of view, the tape has an improved grip due to both the type of material used and the sectional geometry of said tape.

Furthermore, the improved grip on the handlebars does not require any other components (adhesives) and is therefore unalterable over time.

It is also possible to obtain the tape with the above injected materials with differentiated hardnesses between 5 SHA and 60 SHA, also co-injecting inner filler materials differentiated from the outer surfaces, such as 50% of materials obtained from recycling.

Economic advantages=automation of the production process and high daily production capacities.

A person skilled in the art, for the purpose of satisfying contingent and specific needs, may make numerous modifications and variations to the solutions described above.

The scope of protection of the invention is defined by the following claims.

The invention claimed is:

1. A covering tape for bicycle handlebars, comprising:
    an elongated foldable body, extending along a main longitudinal direction between opposite axial ends,
    wherein, at one of said axial ends, the body is mechanically integral with a cylindrical closing cap for a hollow end of said bicycle handlebars;
    wherein the covering tape comprises thermoplastic material having a density between 0.30 g/cm$^3$ and 0.90 g/cm$^3$.

2. The covering tape for bicycle handlebars according to claim 1, wherein the body is tangentially fixed to an outer side wall of said cylindrical closing cap.

3. The covering tape for bicycle handlebars according to claim 1, wherein the body has a width, measured as a distance between opposite side edges of the body parallel to the main longitudinal direction, equal to a height of the cylindrical closing cap.

4. The covering tape for bicycle handlebars according to claim 3, wherein the body is aligned with the cylindrical closing cap, so that said side edges delimit a base and a crown of the cylindrical closing cap.

5. The covering tape for bicycle handlebars according to claim 1, wherein the body is made in a single piece with said cylindrical closing cap.

6. The covering tape for bicycle handlebars according to claim 1, wherein the body with said cylindrical closing cap comprise a co-molded or co-extruded element.

7. The covering tape for bicycle handlebars according to claim 1, wherein the covering tape comprises a molded or extruded thermoplastic material.

8. The covering tape for bicycle handlebars according to claim 7, wherein said thermoplastic material is a closed-cell thermoplastic material.

9. The covering tape for bicycle handlebars according to claim 1, wherein the covering tape comprises a thermoplastic material at least partially expanded by expanding additives.

10. The covering tape for bicycle handlebars according to claim 1, wherein the covering tape comprises closed-cell thermoplastic material which incorporates antibacterial additives.

11. The covering tape for bicycle handlebars according to claim 1, wherein the body is symmetrical with respect to a centerline plane parallel to said main longitudinal direction.

12. The covering tape for bicycle handlebars according to claim 1, wherein the body, with respect to a section plane perpendicular to the main longitudinal direction, has a symmetrical section with a degrading thickness, moving from the centerline plane towards side edges of the covering tape.

13. The covering tape for bicycle handlebars according to claim 12, wherein, at said inner side, the tape comprises grooves and/or channels located proximate the central portion, straddling the centerline plane, wherein said grooves or channels comprise a wavy pattern located in said central portion, and wherein the side portions are tapered.

14. The covering tape for bicycle handlebars according to claim 1, wherein, at an inner side configured to interface in contact with the handlebars, the body comprises a plurality of grooves and/or channels.

15. The covering tape for bicycle handlebars according to claim 14, wherein said grooves and/or channels are located in side portions proximate side edges of the covering tape.

16. The covering tape for bicycle handlebars according to claim 1, wherein, at an outer side configured to interface with the user's hands, the body comprises a plurality of grooves and/or channels.

17. The covering tape for bicycle handlebars according to claim 16, wherein said grooves and/or channels are located proximate a central portion of the covering tape, straddling a centerline plane of the body.

18. A covering tape for bicycle handlebars, comprising:
    an elongated foldable body, extending along a main longitudinal direction between opposite axial ends;
    wherein, at one of said axial ends, the body is mechanically integral with a cylindrical closing cap for a hollow end of said bicycle handlebars;
    wherein the material of the covering tape has a hardness between 5 Shore A and 60 Shore A.

19. A covering tape for bicycle handlebars, comprising:
    an elongated foldable body, extending along a main longitudinal direction between opposite axial ends;
    wherein, at one of said axial ends, the body is mechanically integral with a cylindrical closing cap for a hollow end of said bicycle handlebars;
    wherein the covering tape is bi-material with different hardnesses, wherein a central portion, straddling a centerline plane of the covering tape parallel to said main longitudinal direction, has a greater hardness, than side portions, between the central portion and side edges of the covering tape.

20. A covering tape for bicycle handlebars, comprising:
    an elongated foldable body, extending along a main longitudinal direction between opposite axial ends;
    wherein, at one of said axial ends, the body is mechanically integral with a cylindrical closing cap for a hollow end of said bicycle handlebars;
    wherein the covering tape is bi-material with different hardnesses, wherein an outer portion, configured to be opposite the associable handlebars, has a greater hardness than an inner portion, configured to interface with the associable handlebars.

* * * * *